United States Patent Office 2,970,167
Patented Jan. 31, 1961

2,970,167

(ALKYLENEDISULFONYL)DIBENZOATES

Fritz Hostettler, Charleston, and Nelson R. Eldred, South Charleston, W. Va., assignors to Union Carbide Corporation, a corporation of New York No Drawing. Filed Oct. 7, 1957, Ser. No. 688,412

10 Claims. (Cl. 260—470)

This invention relates to novel compounds that are useful in the preparation of high melting and readily dyeable synthetic textile fibers of high strength and excellent thermal stability.

The compounds of the invention are characterized by the general formula

I.                      $R'[SO_2R''COOX]_2$ in which the R's are divalent arylene radicals, the R"'s are saturated divalent hydrocarbon radicals and the X's are hydrogen or saturated lower alkyl radicals.

The disulfones that are preferred particularly for use in forming synthetic textile fibers are those having a symmetrical structure in which the X's are methyl groups, the R's are para-phenylene groups and the R"'s are straight or branched chain alkylene radicals containing from two to ten carbon atoms or para-dialkylene phenylene radicals containing up to ten carbon atoms. Higher alkyl diesters such as ethyl, propyl, etc. are also useful in the preparation of synthetic textile fibers so long as the terminal alkyl radicals are capable of forming alcohols boiling below about 200° C.

The disulfones of the invention can be prepared in several ways. One method of preparation that has been found suitable involves reacting an alkylene dichloride, $R'Cl_2$, in which the R' is as defined with reference to Formula I, with a salt of an aralkyl thiol, Alkyl-RSNa, in which the R is as defined with reference to Formula I, prepared by reacting the thiol with sodium hydroxide in the presence of aqueous ethanol, to form the corresponding dithio compound, oxidizing the dithio compound thus formed with peracetic acid, hydrogen peroxide, or other suitable oxidizing agent to convert it into the corresponding disulfone, and further oxidizing it with chromium trioxide or the like to the corresponding disulfonyl dicarboxylic acid. If a diester is desired, the disulfonyl dicarboxylic acid can be esterified with the appropriate alcohol. The entire sequence of reaction for forming a disulfonyl dicarboxylic acid and then esterifying it to the corresponding dimethyl ester is illustrated as follows:

II.

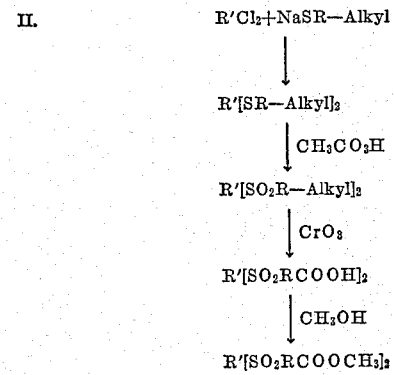

The compounds of the invention are distinguished by high thermal stability, a characteristic that is important in the melt polymerization or copolymerization involved in the preparation of synthetic textile fibers. They are capable of forming excellent fibers by polycondensation with various diols and diamines and are also useful in modifying polyethylene terephthalate fibers and filaments to make them more receptive to dyeing without appreciably lowering their melting points.

These and other advantages, as well as the utility of the compounds of the invention, and a more detailed description of several methods of preparation, will become apparent from the following examples included to set forth the best modes now contemplated for carrying out the invention.

EXAMPLE 1

*Part A.—Preparation of 4,4'-(tetramethylenedithio) ditoluene*

Para-toluenethiol (139 grams) and 45 grams of sodium hydroxide were dissolved in 350 ml. of 75% aqueous ethanol. The solution was heated to 70° C., and 1,4-dichlorobutane was added slowly. After heating for five hours under reflux, the solution was cooled and the precipitate collected by filtration. The product was extracted with acetone, and the acetone solution evaporated. The residue from the acetone extract was recrystallized from ethanol. It was obtained in a yield of 139 grams and had a melting point of 63° C.

*Part B.—Preparation of 4,4'-(tetramethylenedisulfonyl)-ditoluene*

4,4'-(tetramethylenedithio)ditoluene (50 grams) was dissolved in 300 ml. of acetone, heated to 45 to 50° C. and treated with 50% more than the calculated theoretical amount of a solution of peracetic acid in acetone. The product crystallized from the reaction mixture on cooling. It was obtained in a yield of 52 grams and had a melting point of 149° C.

*Part C.—Preparation of 4,4'-(tetramethylenedisulfonyl)-dibenzoic acid and dimethyl 4,4'-(tetramethylenedisulfonyl)dibenzoate*

The 4,4'-(tetramethylenedisulfonyl)ditoluene (25 grams) was oxidized to the diacid by dissolving in acetic acid and treating with chromium trioxide. The acid was then dissolved in 75 ml. benzotrichloride by heating and stirring for three hours at 195° C. The excess benzotrichloride was distilled under reduced pressure, the residue was taken up in 600 ml. dioxane, heated to boiling, and treated slowly with 150 ml. methanol. The solution was treated with decolorizing carbon, filtered and cooled. The desired dimethyl ester was recrystallized from dioxane. The yield was 20 grams. It had a melting point of 201° C. Carbon and hydrogen contents for

or $C_{20}H_{22}O_8S_2$ are:

Calculated: C=52.86 bw; H=4.88% bw.
Found on analysis: C=52.63% bw; H=4.98% bw.

EXAMPLE 2

*Part A.—Preparation of 4,4'-(hexamethylenedithio)-ditoluene*

Para-toluenethiol (248 parts) and hexamethylene dichloride (155 parts) were dissolved in ethanol (800 cc.) in a three-liter four-neck flask equipped with a stirrer, condenser, thermometer, and dropping funnel. An aqueous solution of sodium hydroxide (80 grams in 200 cc.) was added dropwise at 40 to 45° C. and a thick paste-like material precipitated out. After the addition was completed, the mixture was heated to reflux for six hours. The pH of the mix was 8.5 after the refluxing period. The material was filtered hot to remove most of the sodium chloride. The filtrate was cooled and the crude 4,4'-(hexamethylenedithio)ditoluene (melting point 54 to 60° C.) precipitated and was filtered.

After one recrystallization from each acetone, acetonitrile, and methanol, the desired ditoluene was obtained in excellent purity and 95% yield. The melting point of the pure compound was 64 to 65° C.

*Part B.—Preparation of 4,4'-(hexamethylenedisulfonyl)-ditoluene*

4,4'-(hexamethylenedithio)ditoluene (290 parts) was dissolved in dimethylformamide (700 cc.) in a five-liter four-neck flask equipped with a stirrer, condenser, thermometer, and dropping funnel. A 25% solution of peracetic acid in ethyl acetate (1162 parts) was added dropwise at 55 to 60° C. After completion of the addition the mix was heated for 3.5 hours at 75° C., cooled, and the precipitate filtered. The crude sulfone (melting point 147 to 149° C.) was recrystallized from acetonitrile, dioxane, and acetone.

4,4'-(hexamethylenedisulfonyl)ditoluene was obtained in 95% yield. It had a melting point of 154 to 155° C.

*Part C.—Preparation of 4,4'-(hexamethylenedisulfonyl)-dibenzoic acid*

4,4'-(hexamethylenedisulfonyl)ditoluene (225 parts) was dissolved in acetic acid (300 cc.) in a one-liter four-neck flask equipped with a stirrer, condenser, stopper, and thermometer. The solution was heated to 100° C. and chromic acid (50 parts) was added portion-wise at 100 to 105° C. After completion of the addition the mixture was stirred for forty-five minutes at 110° C. and the precipitated material (melting point 293 to 306° C.) was filtered out. The filtrate was poured into ice-water yielding a second crop of crude product (melting point 225 to 297° C.) which was reoxidized according to the above procedure.

The crude 4,4' - (hexamethylenedisulfonyl)dibenzoic acid was obtained after several washings with acetic acid in 66% yield. The melting point of the compound was 293 to 306° C.

*Part D.—Preparation of dimethyl 4,4'-(hexamethylenedisulfonyl)-dibenzoate*

4,4' - (hexamethylenedisulfonyl)dibenzoic acid (206 parts) was charged to a five-liter four-neck flask equipped with stirrer, condenser, thermometer, and dropping funnel and refluxed in excess methanol with sulfuric acid (1000 parts) for sixty hours. The mixture was filtered hot. The filter cake (melting point 181 to 187° C.) was washed with cold methanol and recrystallized from dioxane and acetonitrile and treated once with active carbon in acetonitrile.

Dimethyl 4,4' - (hexamethylenedisulfonyl)dibenzoate was obtained in 45% yield. The melting point of the compound was 189° C. Carbon and hydrogen contents for

or $C_{22}H_{26}O_8S_2$ are:

Calculated: C=54.77% bw; H=5.43% bw.
Found on analysis: C=54.99% bw; H=5.38% bw.

It is to be expected that numerous modifications will readily become apparent to those skilled in the art upon reading this description. All such modifications are intended to be included within the scope of the invention as defined in the appended claims.

We claim:

1. Compound having the general formula

wherein R' is a saturated divalent alkylene hydrocarbon containing from two to ten carbon atoms, and the X's stand for members of the group consisting of hydrogen and saturated lower alkyl radicals.

2. Compound as defined in claim 1 wherein the X's are methyl radicals.

3. Compound as defined in claim 1 wherein the X's are hydrogen.

4. Compound as defined in claim 1 wherein R' is a polymethylene radical containing from two to ten carbon atoms.

5. Compound as defined in claim 1 wherein R' is a tetramethylene radical.

6. Compound as defined in claim 1 wherein R' is a hexamethylene radical.

7. Dimethyl 4,4'-(tetramethylenedisulfonyl)dibenzoate.
8. Dimethyl 4,4'-(hexamethylenedisulfonyl)dibenzoate.
9. 4,4'-(tetramethylenedisulfonyl)dibenzoic acid.
10. 4,4'-(hexamethylenedisulfonyl)dibenzoic acid.

References Cited in the file of this patent
UNITED STATES PATENTS

| | | |
|---|---|---|
| 2,393,327 | Langkammerer | Jan. 22, 1946 |
| 2,552,269 | Emerson et al. | May 8, 1951 |
| 2,571,251 | Jones | Oct. 16, 1951 |
| 2,640,848 | Harman et al. | June 2, 1953 |
| 2,657,231 | Klarer et al. | Oct. 27, 1953 |
| 2,720,502 | Caldwell | Oct. 11, 1955 |